United States Patent
Cobb et al.

(10) Patent No.: US 6,606,357 B1
(45) Date of Patent: Aug. 12, 2003

(54) CARRIER INJECTING WAVEFORM-BASED MODULATION SCHEME FOR REDUCING SATELLITE TRANSPONDER POWER REQUIREMENTS AND EARTH TERMINAL ANTENNA SIZE

(75) Inventors: Raymond F. Cobb, Melbourne Beach, FL (US); Michael B. Luntz, Merritt Island, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/393,639

(22) Filed: Sep. 10, 1999

(51) Int. Cl.⁷ .......................... H04L 27/10; H04L 27/20
(52) U.S. Cl. ..................... 375/281; 375/308; 375/332; 329/304; 332/103
(58) Field of Search ................. 375/279, 280, 375/281, 284, 141, 146, 147, 308, 329, 332, 330, 331; 329/304; 332/103; 370/342

(56) References Cited

U.S. PATENT DOCUMENTS

| | | | |
|---|---|---|---|
| 3,569,626 A | 3/1971 | Michishita | 178/67 |
| 3,815,034 A | 6/1974 | Kato | 329/104 |
| 3,828,138 A | 8/1974 | Fletcher et al. | 179/15 |
| 4,216,542 A | * 8/1980 | Frosch et al. | 332/103 |
| 4,313,205 A | 1/1982 | Rhodes | 375/86 |
| 4,466,108 A | 8/1984 | Rhodes | 375/83 |
| 4,472,817 A | 9/1984 | Poklemba et al. | 375/97 |
| 4,501,002 A | 2/1985 | Auchterlonie | 375/86 |
| 4,620,159 A | 10/1986 | Yoshida et al. | 329/50 |
| 4,674,103 A | 6/1987 | Chevillat et al. | 375/13 |
| 4,787,096 A | 11/1988 | Wong | 375/120 |
| 4,795,986 A | 1/1989 | Ceroni et al. | 329/124 |
| 4,814,719 A | 3/1989 | Guyer | 329/124 |
| 4,847,872 A | 7/1989 | Hespelt et al. | 375/97 |
| 4,953,181 A | 8/1990 | Keiper, Jr. | 375/10 |
| 4,980,648 A | 12/1990 | Jaeger et al. | 329/308 |
| 5,073,904 A | 12/1991 | Nakamura et al. | 375/94 |
| 5,077,531 A | 12/1991 | Takeuchi et al. | 329/304 |
| 5,081,645 A | 1/1992 | Resnikoff et al. | 375/1 |
| 5,084,903 A | 1/1992 | Mc Namara et al. | 375/18 |
| 5,097,487 A | 3/1992 | Walp | 375/97 |
| 5,115,454 A | 5/1992 | Kucar | 375/77 |
| 5,150,383 A | 9/1992 | Misaizu et al. | 375/94 |
| 5,212,814 A | * 5/1993 | Iwane | 330/127 |
| 5,214,674 A | 5/1993 | Sayegh | 375/97 |
| 5,229,997 A | 7/1993 | Hirata et al. | 370/104.1 |
| 5,247,543 A | 9/1993 | Tsuda et al. | 375/97 |
| 5,260,974 A | 11/1993 | Johnson et al. | 375/76 |
| 5,355,114 A | 10/1994 | Sutterlin et al. | 340/310 |
| 5,412,620 A | 5/1995 | Cafarella et al. | 367/134 |
| 5,440,266 A | 8/1995 | Ono | 329/307 |
| 5,533,060 A | 7/1996 | Kameo | 375/332 |
| 5,541,965 A | 7/1996 | Daffara | 375/326 |
| 5,563,550 A | 10/1996 | Toth | 329/347 |

(List continued on next page.)

OTHER PUBLICATIONS

"Phase Shift Keying with a Transmitted Reference" by J.J. Bussgang and M. Leiter, IEEE Transactions on Communication Technology, vol. Com–14, No. 1, Feb., 1966 pp. 14–22.

*Primary Examiner*—Don N. Vo
(74) *Attorney, Agent, or Firm*—Allen, Dyer, Doppelt, Milbrath & Gilchrist, P.A.

(57) ABSTRACT

A QPSK modulation scheme uses a data spreading mechanism to rob a relatively limited portion of available transmitter power, and inject into the QPSK waveform a prescribed amount of carrier signal power, through which detection and non-regenerative extraction of the carrier at the receiver may be achieved without incurring a signal-to-noise degradation penalty. In addition, the injected carrier-based modulation scheme of the invention may employ high performance forward error correction coding, to significantly reduce the signal power required for achieving a very low energy per bit-to-noise density ratio ($E_b/N_0$)—on the order of one to zero dB.

31 Claims, 9 Drawing Sheets

U.S. PATENT DOCUMENTS

| | | | |
|---|---|---|---|
| 5,574,399 A | 11/1996 | Oura et al. | 329/306 |
| 5,691,980 A | 11/1997 | Welles, II et al. | 370/316 |
| 5,694,389 A | 12/1997 | Seki et al. | 370/208 |
| 5,715,521 A | 2/1998 | Fukasawa et al. | 455/69 |
| 5,748,623 A * | 5/1998 | Sawahashi et al. | 370/342 |
| 5,748,677 A | 5/1998 | Kumar | 375/285 |
| 5,790,602 A | 8/1998 | Stephens | 375/326 |
| 5,799,047 A | 8/1998 | Dobrica | 375/350 |
| 5,828,694 A | 10/1998 | Schipper | 375/208 |
| 5,838,736 A | 11/1998 | Thomas et al. | 375/329 |
| 5,875,215 A | 2/1999 | Dobrica | 375/344 |
| 5,914,950 A * | 6/1999 | Tiedemann et al. | 370/335 |
| 6,094,450 A * | 7/2000 | Shockey | 329/304 |
| 6,396,880 B1 * | 5/2002 | Stroud | 375/308 |

* cited by examiner

TRANSMIT SITE 10

RECEIVING SITE 20

US 6,606,357 B1

CARRIER INJECTING WAVEFORM-BASED MODULATION SCHEME FOR REDUCING SATELLITE TRANSPONDER POWER REQUIREMENTS AND EARTH TERMINAL ANTENNA SIZE

FIELD OF THE INVENTION

The present invention relates in general to communication systems, and is particularly directed to a new and improved modulation scheme that is especially suited for QPSK-based satellite communication systems. The modulation scheme is effective to rob a relatively limited portion of the available transmitter power, and inject into the QPSK waveform a prescribed amount of carrier energy, through which detection and recovery of the carrier at the receiver may be achieved without incurring a signal to noise degradation penalty. In addition, the injected carrier-based modulation scheme of the invention exploits the substantially improved performance of modern forward error correction codes, and significantly reduces the signal power required for achieving a relatively low bit error rate.

BACKGROUND OF THE INVENTION

A major concern of both providers and users of satellite communication systems is how to maximize the use of system resources. The most important resources are considered to be transponder bandwidth and effective isotropic radiated power (EIRP), since some portion of each is employed by every signal sent through the transponder. Because satellite resources are expensive (for example, a single transponder may cost hundreds of thousands of dollars per month in leasing fees), for the case where satellite power is the scare resource, minimizing the amount of power required for each signal allows more signals to be sent through the transponder, and thereby reduces leasing fees. An alternative application is to reduce the aperture size of the receiver antenna for the same transponder power. More recently developed low-cost systems that use small aperture antennas tend to be power-limited as they have lower G/T values, and therefore require more power from the satellite.

FIGS. 1 and 2 are examples of simulated spectrum analyzer displays of satellite transponder utilization. In the spectral utilization of FIG. 1, wherein the available passband is essentially 'packed' with signals, optimum utilization is obtained when all of the transponder's available EIRP is employed. The utilization diagram of FIG. 2, on the other hand, shows the case where more than half of the transponder's bandwidth goes unused. This condition indicates that money is wasted, since users are paying for the entire transponder, but utilizing -only a portion of its available capacity. Such power-limited utilization of the transponder may be due to the receiving antennas on the ground having relatively small apertures, so that more power is required for adequate signal quality.

Earth terminals of commercial satellite communication systems have historically employed relatively large, and therefore large gain-to-noise temperature (G/T) ratio, antennas. Since these systems tend to be bandwidth-limited, considerable effort has gone into developing more bandwidth-efficient modulation techniques, such as using some form of M-ary phase shift keying (MPSK) and quadrature amplitude modulation (QAM). Much less work has been carried out in improving power efficiency than in improving bandwidth efficiency. If more power-efficient modulation techniques were available, then each signal would require less power, and a larger number signals could be sent through a power-limited transponder. Alternatively, if the amount of power a given signal requires can be minimized, the required earth terminal EIRP and hence transmitter and/or antenna aperture size can be minimized. This is a third major benefit to small-aperture systems, which enjoy: 1- reduced satellite power usage; 2- reduced transmitter power or antenna aperture for the ground terminal; and 3- reduced antenna aperture for the receive terminal. The first and second benefits go together, while the third may be considered a trade-off against the first and second.

FIG. 3 diagrammatically illustrates the modulation and demodulation signal schemes employed by respective transmitting and receiving earth stations 10 and 20 that are linked by a satellite transponder 30 of a typical QPSK system. Historically, QPSK (and also BPSK) has been a preferred modulation scheme for satellite communications since, among other advantages, no additional energy is required to transmit a discrete carrier reference. Instead, the demodulator is responsible for restoring or 'regenerating' the carrier based on the received signal.

At the transmit site 10, quadrature channel data symbols $d_I$ and $d_Q$, that have been encoded with some form of forward error correction (FEC) code, are modulated in mixers 11I and 11Q onto respective phase-quadrature components of a carrier signal $f_C$. As will be discussed in detail below, the use of forward error correction encoding of the data serves to trade bandwidth for power. The phase quadrature modulated signals are then summed in a summer 13 into a composite QPSK signal. This QPSK signal, a spectral waveform for which is shown in FIG. 4, is transmitted via amplifier-feed circuitry 14 coupled to an antenna 15.

At the receive site 20, signals received by an antenna 22 and associated low noise amplifier circuitry 23 are coupled to a demodulator loop, which supplies both I and Q carrier references. To demodulate the data, the received signal is coupled to a carrier recovery or regeneration path 25 and a data recovery path 27. As shown in the spectral diagram of FIG. 4, since no discrete carrier component is separately transmitted from the transmit site 10, the carrier must be 'regenerated' at the receive site 20.

For QPSK signals this is usually accomplished by means of a relatively complex circuit 26, such as a Costas loop, or a fourth-power circuit, so as to provide a carrier reference. Its output drives a phase locked loop 28, so as to provide a carrier reference for the data recovery path. The data recovery path 27 includes a phase detector 29I/Q, to which the received I/Q channel data plus carrier and the regenerated carrier signals are supplied. The output of the phase detector 29I/Q represents the encoded data symbols, which are applied to downstream error correction recovery circuitry to recover the original data.

As described above with reference to the transponder utilization diagram FIG. 2, a large percentage of transponder bandwidth often goes unused, so that improving power efficiency will allow more signals to be transmitted through the same transponder. In fact, using more bandwidth to gain power efficiency is a good trade in many systems, as there will still be sufficient bandwidth to support additional users. One way to trade bandwidth for power is to avoid the use of modulation waveforms, such as QAM, that give up power efficiency for bandwidth. As shown in system diagram of FIG. 3, described above, another technique is to use forward error correcting codes. In addition to the use of FEC codes, error detection and retransmission can be used to minimize transponder power usage.

Forward error correcting codes trade bandwidth for power by sending redundant symbols in order to enable errors to be corrected at the receive site. Forward error correction has a long history in satellite communication systems and many types of decoders are available as inexpensive chips. Some codes employ check bits to verify that no errors were made in the reception. If an error is detected, then the receiving site requests that the transmitter site re-send the block of data where the error appeared. This can be a difficult technique for communication over geosynchronous satellites, due to the long time delays involved. Protocols have been developed with these delays in mind, and many systems now employ both error detection and retransmission. Still, in heavy fading conditions, as can occur during rainstorms, the system may often become clogged with retransmissions. As a result, performing all error correction at the receiver is highly desirable, even if retransmission is used.

At present, the most commonly used error correcting codes are convolutional codes, typically running at rate ½, wherein two coded symbols are transmitted for every one information symbol, thus doubling the transmission rate and hence the occupied bandwidth. One way to gain efficiency at the expense of bandwidth is to use even lower-rate codes, such as rate ⅓ codes. Another common technique is to concatenate two codes. This most often takes the form of concatenating a convolutional code with a block code, such as a Reed-Solomon code. These two types of codes have good synergy, and significant power gains can be realized with relatively little additional band-spreading.

A significant problem with these types of codes is that they do not necessarily work well at a very low energy per bit-to-noise density ratio ($E_b/N_0$)—on the order of one to zero dB. While these codes are capable of yielding ultra-low error rates at moderate $E_b/N_0$ values, they do not produce a significant drop in required power for moderate error rates (their efficiency falls off rapidly below about 4 dB $E_b/N_0$). Commercially available demodulators are built with this limitation in mind, and do not provide carrier tracking below about 4 dB $E_b/N_0$.

Demodulation with a low-rate code, such as rate ½ or rate ⅓, at a very low $E_b/N_0$ is difficult for two reasons: first- carrier phase and symbol timing are very difficult to recover; second- maintaining soft decision thresholds is also a problem. A high ratio of the symbol rate to the data rate implies a very low $E_s/N_0$. For example, for a rate ⅓ code, $E_s/N_0$ is about 5 dB less than $E_b/N_0$. The demodulator must have sufficient bandwidth to pass these high symbol rates, and thus must work at an extremely low signal to noise ratio (S/N). As discussed above, carrier recovery generally involves a nonlinear operation, such as raising the signal to a power (e.g., fourth power in the carrier regenerator circuit 26 of FIG. 3). When carried out at a very low signal to noise ratio, the signal to noise ratio is reduced even further, making the demodulator's task of recovering the data extremely difficult.

FIG. 5 demonstrates the carrier recovery problem using a fourth power circuit for QPSK signals. (Other means of carrier regeneration such as Costas loops offer approximately the same performance as the fourth power device.) To track down to 0 dB $E_s/N_0$ using a rate ⅓ code for QPSK demodulation, the input SNR is about −2 dB and the output SNR is about −38 dB. This causes a very difficult, if not effectively impossible acquisition problem, which mandates the use of extremely narrow tracking loops to maintain an accurate phase estimate.

SUMMARY OF THE INVENTION

In accordance with the present invention, the above discussed power and bandwidth utilization problems associated with conventional carrierless PSK modulation schemes employed for satellite communication systems are effectively obviated by means of a modulation waveform that is effective to rob a relatively limited portion of the available transmitter power, and inject into the QPSK waveform a prescribed amount of carrier energy, for example at about 15 dB below the signal. This injected carrier component serves to facilitate detection and recovery (rather than non-linear regeneration) of the carrier at the receiver.

In addition, the injected carrier-based modulation scheme of the invention exploits the substantially improved performance of modern forward error correction coding schemes, such as but not limited to turbo codes, so as to significantly reduce the signal power required for achieving a relatively low bit error rate. Namely, using a prescribed 'carrier-injecting' waveform in combination with advanced coding techniques enables the invention to double the number of small-terminal users on a satellite transponder, thus effectively halving their leasing costs. Conversely, the waveform of the invention allows use of a smaller antenna for more flexible siting or mobility.

Pursuant to a first embodiment, a DC offset or bias is applied to the encoded data stream upstream of the QPSK modulation circuitry, which serves to shift reference levels for the encoded in-phase data symbol stream to values that cause the spectral waveform of the QPSK signal to contain a prescribed amount of carrier signal energy. This readily discernible injected carrier obviates the need for a non-linear carrier regeneration circuit in the carrier recovery path of the receiver, as in a conventional QPSK demodulator. Instead, the carrier may be directly extracted by a carrier recovery phase locked loop.

Although transmitting a carrier at about 15 dB below the signal results in very little performance reduction, the bias loss in QPSK causes degradation of the signal to noise ratio. For −15 dB in carrier leakage, the loss is about 0.3 dB at low $E_s/N_0$ values, and becomes progressively worse at higher signal levels. It would be very desirable to avoid this loss; in addition, the transmission of an unmodulated carrier component may result in violation of spectral density requirements, such as international communication standards that limit the energy density that may be irradiated upon the earth from a satellite transponder.

To satisfy these objectives a second embodiment of the invention injects into the QPSK waveform a 'spread' carrier, that is functionally equivalent to that achieved by the direct insertion of a DC bias voltage in the first embodiment. Since the loss incurred with QPSK is caused by a difference in level between a '1' and a '0', the difference can be made to average to zero over a symbol time by chopping the transmitted carrier with a pseudo random square wave having values +1 and −1. If the carrier is spread at the symbol rate, with an edge occurring at mid-bit, for example, the signal level will be averaged within the demodulator matched filter and no degradation will result. This restores the QPSK loss to be the same as for BPSK.

If the carrier is spread using a square wave (i.e., an alternating 1–0 pattern, the transitions are aligned so as to occur at the midpoint of the data symbols. This ensures that the carrier bias averages to zero over a data symbol time. However, if pseudo-random spreading is used, transitions do not occur at every symbol. This permits some data symbols to be biased. By using Manchester (bi-phase) coding on the spreading sequence, a transition is guaranteed at each symbol and the bias is removed.

To recover the carrier, the demodulator of the second embodiment uses a despreading sequence generator identical to that used in the modulator since the spreading operation is synchronous with symbol timing. The received signal is bandpass-filtered and down-converted to a complex baseband signal. To extract the carrier, the complex baseband signal is coupled to a despreading mixer along with a despreading PN waveform supplied by a phase locked loop tuned to the symbol rate. The extracted carrier is filtered using a phase lock loop which provides a coherent carrier reference to each of a pair of in-phase and quadrature channel mixers, to which the complex baseband signal is applied. The outputs of the mixers are filtered in matched filters, symbol timing for which is derived by filtering the data component of the chopped spectrum using a phase lock loop. The recovered data samples and the symbol clock are coupled to a downstream decoder.

In addition to injecting a prescribed amount of carrier energy into the transmitted QPSK waveform, the present invention takes advantage of more powerful modern codes, such as but not limited to 'turbo' codes, which are capable of extending moderate error rate performance down to low values of $E_b/N_0$. High performance codes tend to be directed more toward achieving ultra-low bit error rates at moderate $E_b/N_0$ values, rather than moderate bit error rates at ultra-low $E_b/N_0$, so that there is no real savings in transmitter power in using commercial modems, which are generally designed to hold in no lower than about 4 dB $E_b/N_0$. To realize a sufficient transmitter power savings, the modem must be capable of recovering a coherent carrier reference at negative $E_s/N_0$, which cannot be achieved by a conventional demodulator.

DETAILED DESCRIPTION

Figure 1:
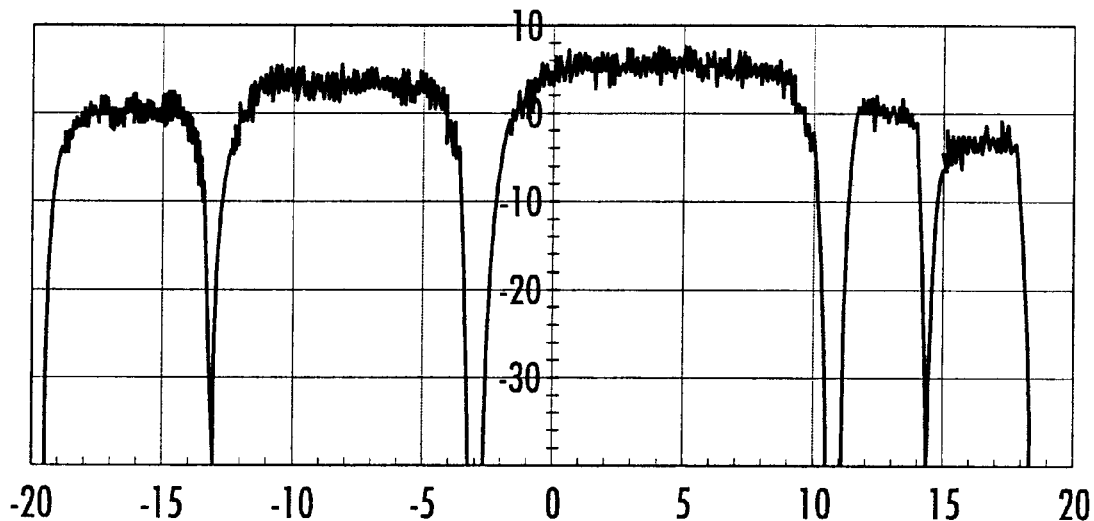
FIG. 1 depicts a simulated spectrum analyzer display of a fully utilized satellite transponder bandwidth.
Figure 2:
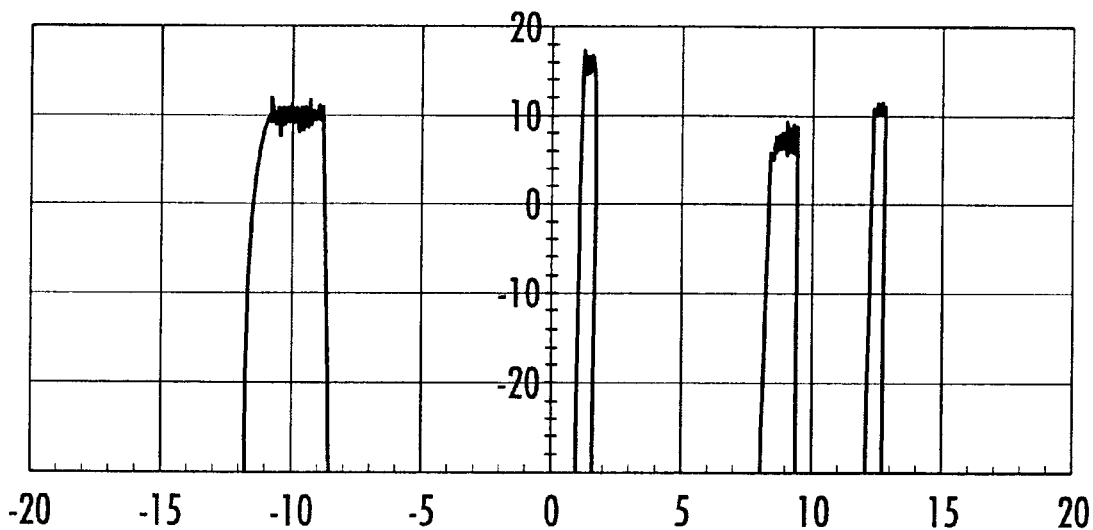
FIG. 2 depicts a simulated spectrum analyzer display of under-utilized bandwidth of a power limited satellite transponder.

Before describing in detail the new and improved carrier injection-based modulation scheme in accordance with the present invention, it should be observed that the invention resides primarily in a prescribed arrangement of conventional communication circuits, associated signal processing components, and attendant circuitry that controls the operation of such circuits and components. As a result, the configuration of such circuits and components, and the manner in which they interface with other communication system equipment have, for the most part, been illustrated in the drawings by readily understandable block diagrams. The block diagram illustrations show only those details that are pertinent to the present invention, so as not to obscure the disclosure with details which will be readily apparent to those skilled in the art having the benefit of the description herein. Thus, the block diagrams are primarily intended to show the major components of the system in a convenient functional grouping, whereby the present invention may be more readily understood.

As discussed above, although QPSK (and also BPSK) has been a favored modulation method for satellite communication systems—because it transmits no separate (energy consuming) carrier reference—the use of signal to noise ratio degrading non-linear components in the carrier regeneration process effectively prevents successful carrier and phase recovery for a very low value of $E_b/N_0$ (e.g., less than four dB). This problem is rendered still more difficult by the use of lower rate codes, such as rate ⅓, which expand the bandwidth of the signal and hence reduce the signal-to-noise ratio still further relative to that for higher rate codes.

Pursuant to the present invention this problem is solved by modifying the conventional QPSK modulation process described above, so as to inject into the resultant QPSK waveform a prescribed amount of carrier energy, that serves to facilitate detection and recovery (rather than non-linear regeneration) of the carrier at the receiver. In addition, the injected carrier-based modulation scheme of the invention may exploit high performance forward error correction (FEC) coding schemes, to significantly reduce the signal power required for achieving a desired bit error probability.

Figure 6:
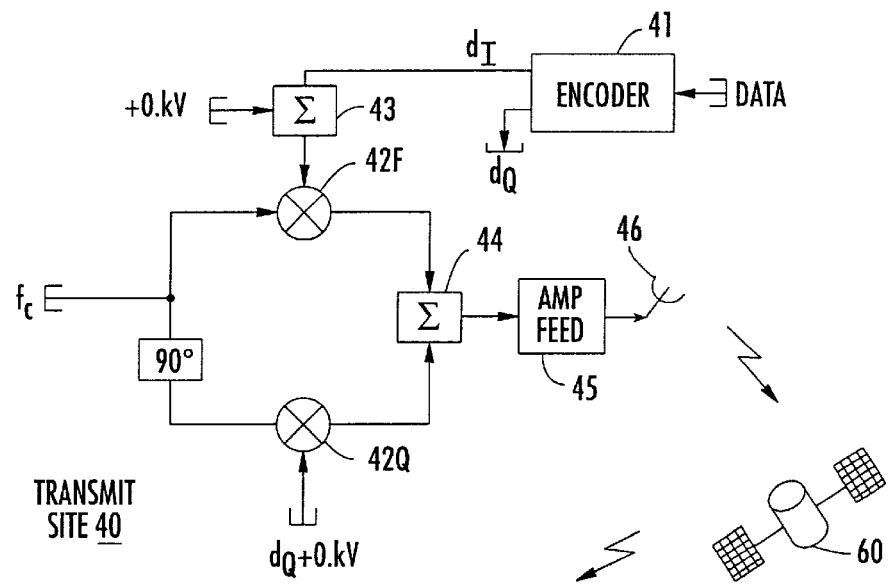
FIG. 6 diagrammatically illustrates a QPSK-based satellite communication system that employs a carrier-injecting modulation scheme in accordance with a first embodiment of the present invention.
Figure 6:
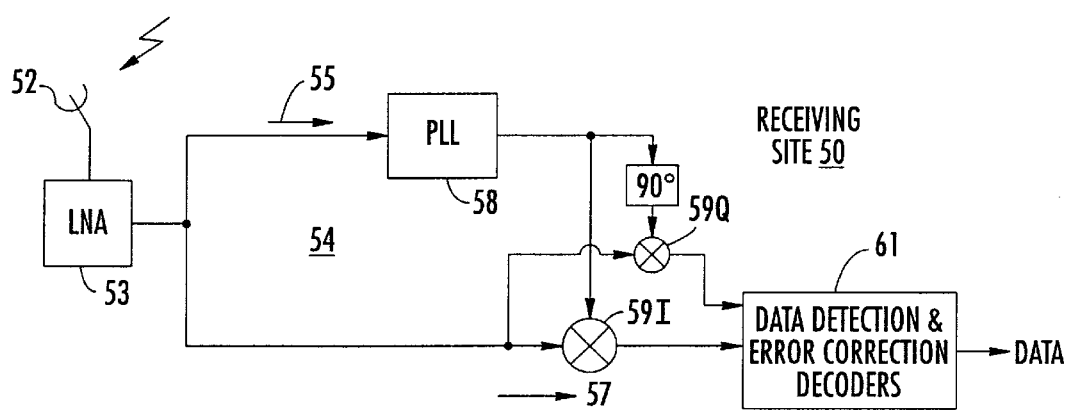

FIG. 6 diagrammatically illustrates a QPSK-based satellite communication system that employs a carrier-injecting modulation scheme in accordance with a first embodiment of the present invention. As in the system diagram of FIG. 1, respective earth stations 40 and 50 are linked by a satellite transponder 60. Although each earth station may include both transmitter and receiver components, in order to simplify the drawings, the configuration and operation of the system will delineate earth station 40 as a transmit site, and earth station 50 as a receive site.

Figure 7:
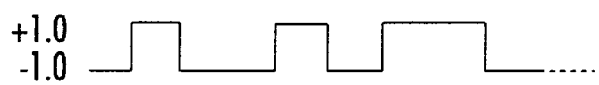
FIG. 7 shows an encoded data symbol stream containing excursions between normalized values of +1.0 volts and −1.0 volts.

At the transmit site 40, in-phase (I) channel and quadrature-phase (Q) channel data symbols $d_I$ and $d_Q$ are encoded in an encoder 41 with a prescribed forward error correction code, such as a high performance code (e.g., a turbo, as a non-limiting example), and coupled to associated mixers 42I and 42Q, to which a carrier signal $f_C$ is also applied. The encoded data symbol streams are typically defined as excursions between prescribed voltage levels, shown in FIG. 7 as respective normalized values of +1.0 volts and −1.0 volts. In addition, the data signal path of one of the channels is summed with a prescribed D.C. voltage level, so as to provide an offset from the ideal normalized value.

Figure 8:
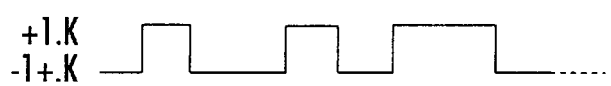
FIG. 8 shows an encoded data symbol stream containing excursions between offset values of 0.k volts relative to the normalized values of +1.0 volts and −1.0 volts.

This is diagrammatically illustrated in FIG. 6, as a summing unit 43 is installed in the in-phase data signal path to which a voltage offset of +0.k volts is applied. The insertion of this DC offset voltage shifts or biases the reference levels for the encoded in-phase data symbol stream to values of 1.k volts and (−1.0+0.k volts), as shown in FIG. 8. The resultant phase quadrature modulated signals produced by mixers 42I and 42Q are then summed in a summing unit 44 to produce a composite QPSK signal, that is transmitted via amplifier-feed circuitry 45 coupled to an antenna 46.

It should be noted that the addition of a bias is not limited to a single data channel. Either of both channels may be biased. This has the effect of changing the phase of the transmitted carrier relative to the data streams. For example, if equal bias is applied to both data channels, the carrier phase will be at 450 relative to the I channel.

Figure 3:
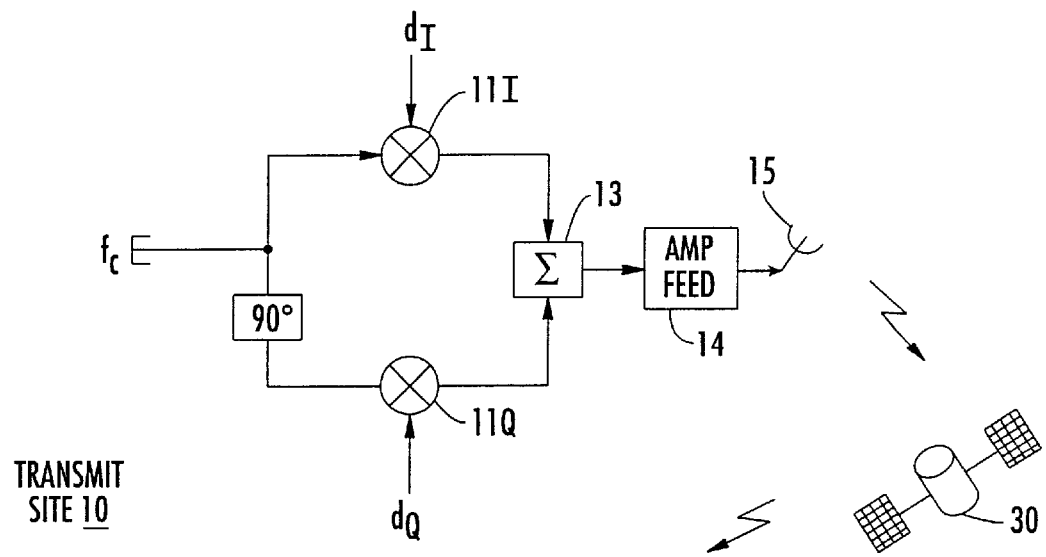
FIG. 3 diagrammatically illustrates modulation and demodulation signal schemes employed by earth stations of a conventional QPSK satellite communication system.
Figure 3:
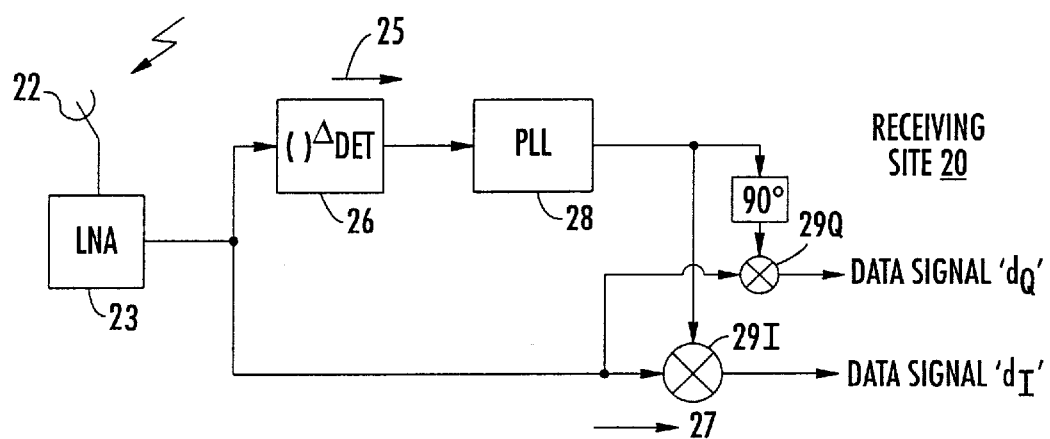
Figure 4:
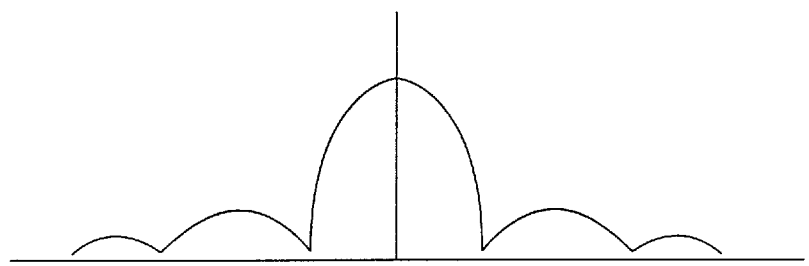
FIG. 4 shows the spectral waveform of a transmitted QPSK signal in the system of FIG. 3.
Figure 9:
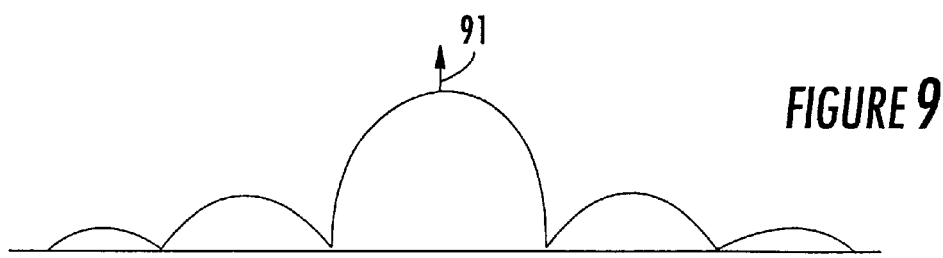
FIG. 9 shows a spectral waveform of a composite QPSK signal produced by the modulator in the system of FIG. 6.

As shown in FIG. 9, the composite QPSK signal has a spectral waveform similar to that of FIG. 4, except that it also contains a prescribed amount of carrier signal energy—shown as a 'spike' 91 at $f_C$—that has been injected into the spectral content of the QPSK waveform, due to the presence of the DC offset or bias imparted into the data signal path. Advantageously, the presence of this readily discernible injected carrier obviates the need for a non-linear circuit-based carrier regeneration circuit in the carrier recovery path of the receiver, as in the conventional scheme of FIG. 3.

At the receive site 50, signals received by an antenna 52 and associated low noise amplifier circuitry 53 are coupled to a single demodulator loop, which is shown at 58. To demodulate the data, the received signal is coupled to a carrier recovery path 55 and a data recovery path 57. Since a prescribed amount of discrete carrier energy is contained in the transmitted QPSK waveform, that carrier may be readily extracted by a phase locked loop 58, without the need for an upstream signal to noise degrading nonlinear carrier regenerator circuit. The data recovery path 55 includes a pair of phase detectors 59I/Q, to which the received I/Q channel data plus carrier and the extracted carrier signals are supplied. The output of the phase detector 59I/Q represents the encoded data symbols, which are detected using matched filters and are applied to data detection and error correction recovery circuitry 61, to recover the original data.

Figure 10:
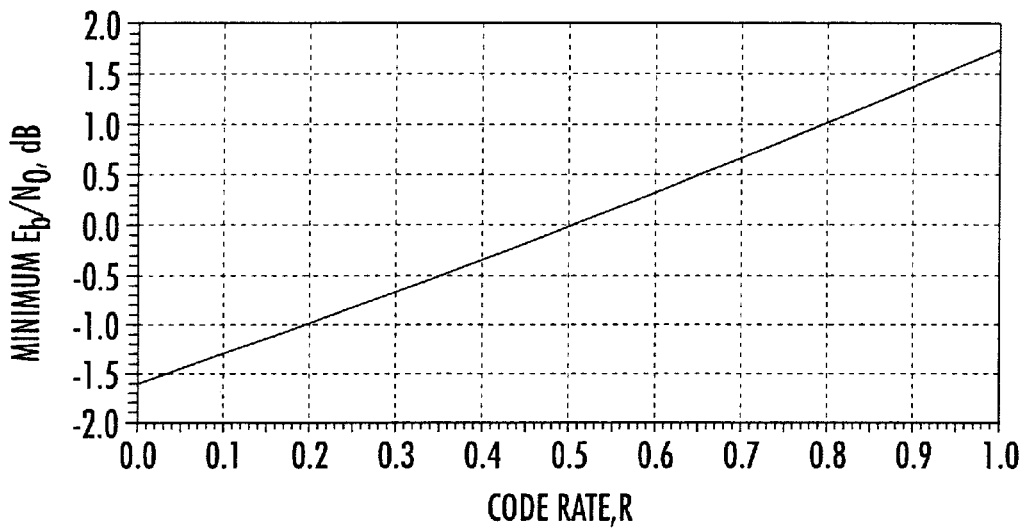
FIG. 10 is a graph illustrating the Shannon Limit.

As discussed above, in addition to injecting a prescribed amount of carrier energy into the transmitted QPSK waveform, the present invention takes advantage of more powerful forward error correction codes which are capable of extending moderate error rate performance down to low values of $E_b/N_0$. A natural limitation exists on how much improvement can be made in power efficiency, no matter how much bandwidth is used. This limit, known as the Shannon Limit, and shown in graphical form in FIG. 10, is actually a limitation on the average of all possible codes that could be used. However, it is an excellent upper bound on performance for any code employed.

In the graph of FIG. 10, the abscissa is the code rate. A rate of 1.0 means uncoded transmission, since the coded rate equals the uncoded rate. The amount of redundancy (the symbol rate) increases towards the ordinate. The Shannon Limit shows that the best that can be done using an infinite band-spreading (code rate 0) is to supply error-free communication at −1.6 dB $E_b/N_0$. The best that can be done with a rate ½ code is to supply error-free communication at 0 dB $E_b/N_0$. Encoding at rate ⅓ potentially provides an additional 0.5 dB coding gain, beyond which the most that can be gained is another 1.1 dB at "infinite" symbol rate, indicating that some rule of diminishing returns is present.

Figure 11:
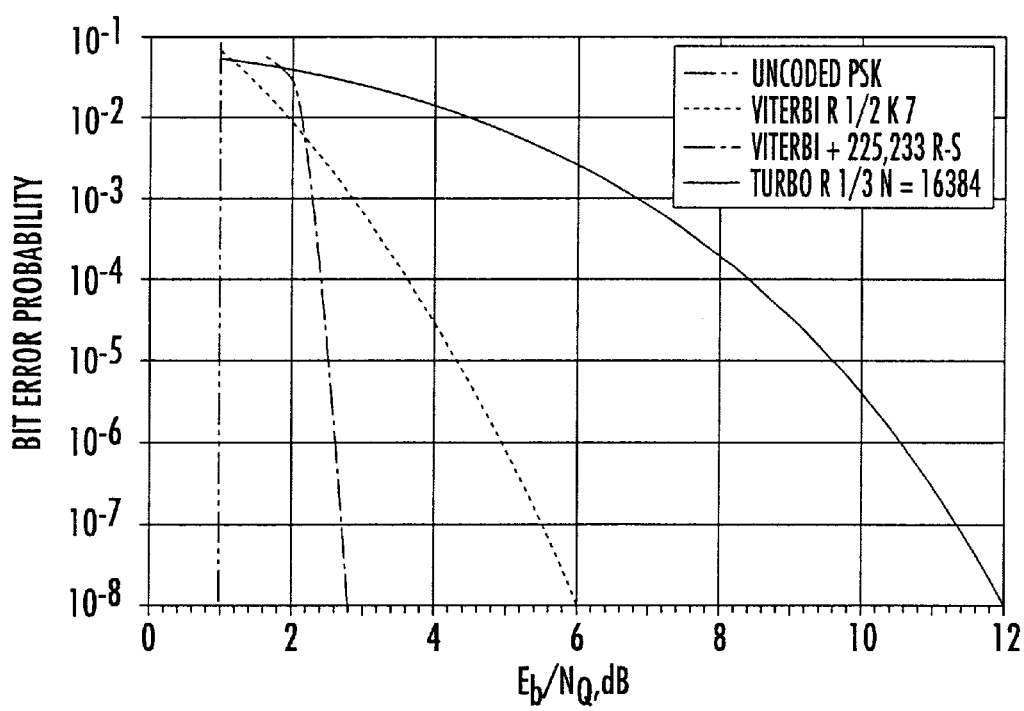
FIG. 11 is a graph containing a set of curves showing the performance of uncoded antipodal communications waveforms.

However, since conventional systems provide carrier tracking only down to about 4 dB $E_b/N_0$, as pointed out above, there is room for more than 4 dB improvement in efficiency at reasonable bandwidths. Even a 3 dB improvement will double the number of signals that can be handled by a transponder, or will reduce antenna gain requirements by half. From the graph of FIG. 11, which contains a set of curves showing the performance of uncoded antipodal communications waveforms, and the same waveforms with various types of error correction coding, it can be seen that a decrease of up to 8 dB in required signal strength is feasible. Error correction codes can provide an 8 dB or more decrease in required power for a given bit error rate, which is advantageous at moderate error rates, only if the demodulator can handle an $E_b/N_0$ of 1 dB or less.

Because high performance codes tend to be directed more toward achieving ultra-low bit error rates at moderate $E_b/N_0$ values, rather than moderate bit error rates at ultra-low $E_b/N_0$, there is no real savings beyond present data values in transmitter power in using commercial modems, which are generally designed to hold in no lower than about 4 dB $E_b/N_0$. To realize a sufficient transmitter power savings, the modem must be capable of recovering a coherent carrier reference at negative $E_S/N_0$. As pointed out above, conventional demodulators do not have this performance. The invention takes full advantage of the power of high performance codes by demodulation at low $E_b/N_0$.

As described above, the spectral waveform of the composite QPSK signal of FIG. 9 contains a prescribed 'spike' of carrier energy 91 that has been injected into the spectral content of the QPSK waveform, due to the presence of the DC bias that has been imparted into the data signal path. It is this injected carrier that obviates the need for a non-linear circuit-based carrier regeneration circuit and enables the receiver's phase locked loop to readily lock onto the carrier.

Figure 5:
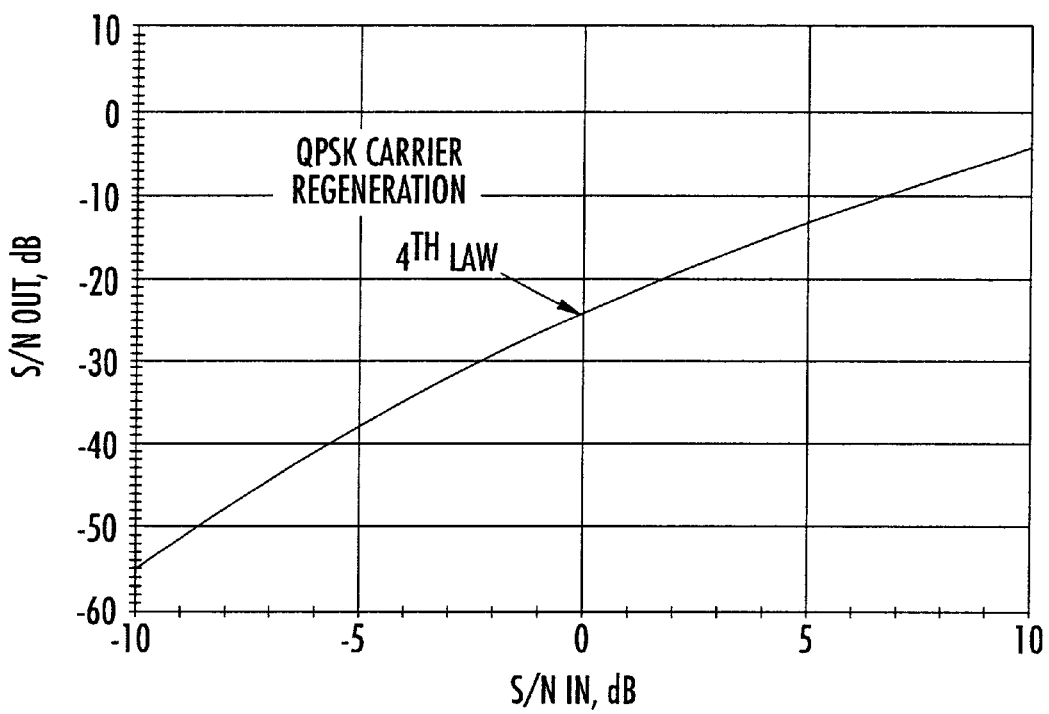
FIG. 5 is a graph associated with carrier regeneration recovery using a fourth power circuit for QPSK signals.
Figure 12:
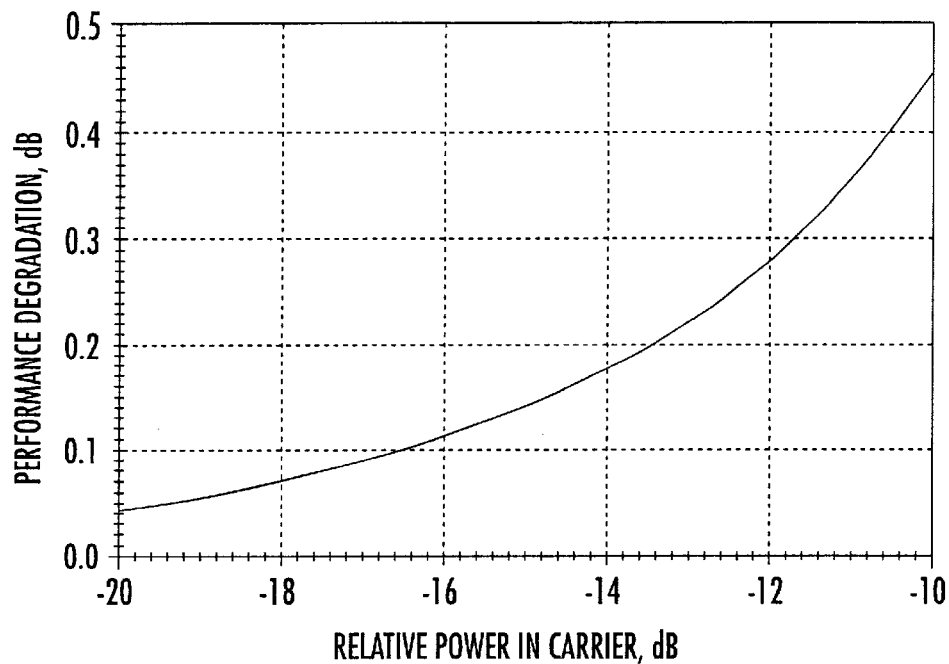
FIG. 12 is a graph showing symbol error rate degradation due to the robbing of power by the injection of the carrier.
Figure 13:
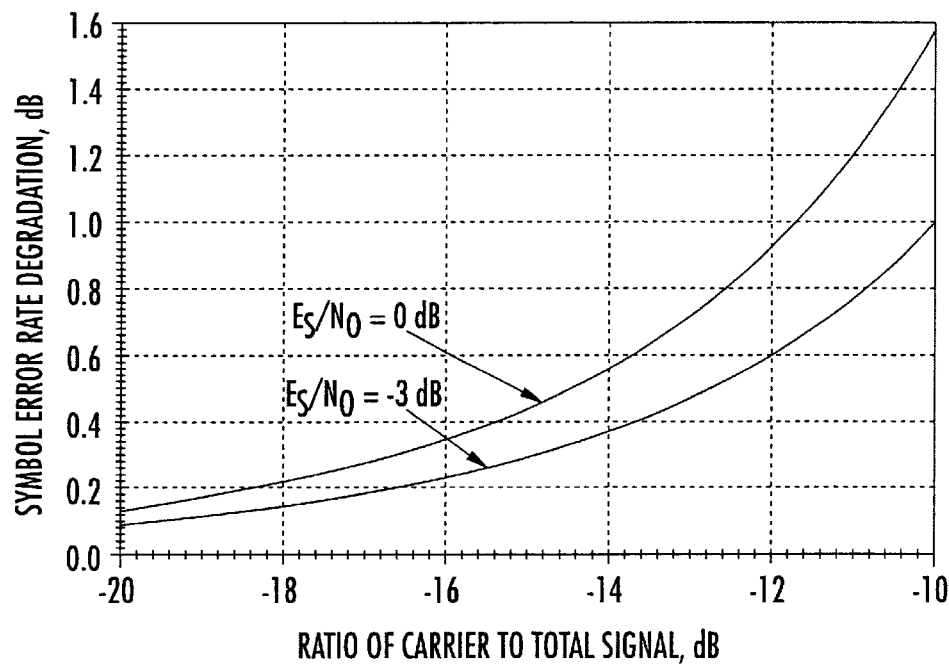
FIG. 13 is a graph showing introduction of bias loss in QPSK causes additional SNR degradation.

FIG. 12 is a graph showing symbol error rate degradation due to the robbing of power by the injection of the carrier. In particular, FIG. 12 shows that transmitting a carrier at about 15 dB below the signal results in very little performance reduction. Given the fact that a 30 dB or greater loss in carrier SNR is incurred if the signal is passed through a fourth power law non-linear device, as shown in FIG. 5, reference above, this is a significant improvement in carrier SNR in exchange for only a very modest decrease in performance. Unfortunately, as shown in the graph of FIG. 13, the bias loss in QPSK causes additional SNR degradation. For −15 dB in carrier leakage, the loss is about 0.3 dB at low $E_S/N_0$ values, and becomes progressively worse or 'flares' at higher signal levels. It would be very desirable to avoid this loss, since the whole purpose of this waveform is to be power efficient. In addition, the transmission of an unmodulated carrier component may result in violation of spectral density standards in some systems, such as international communication standards that limit the energy density (watts/Hz) that may be irradiated upon the earth from a satellite transponder, so that an alternative method to the direct DC bias-based carrier spike approach of FIG. 6 is preferred.

Figure 14:
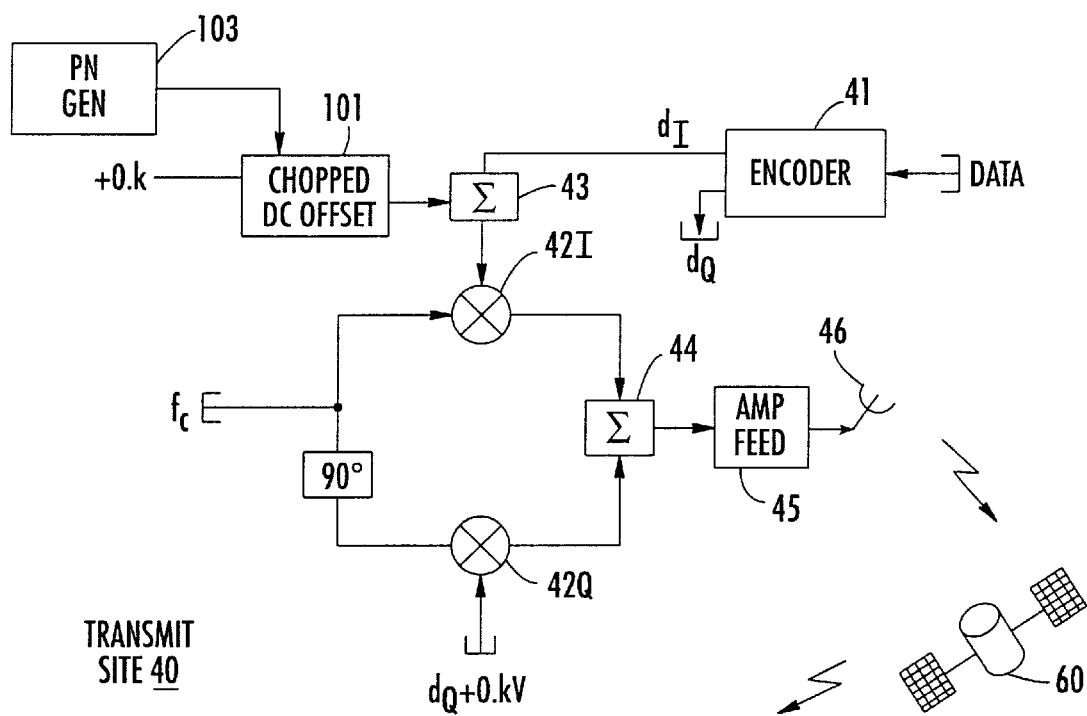
FIGS. 14 and 15 diagrammatically illustrate a QPSK-based satellite communication system having a spread carrier-injecting modulation and demodulation scheme in accordance with a second embodiment of the present invention.
Figure 14:
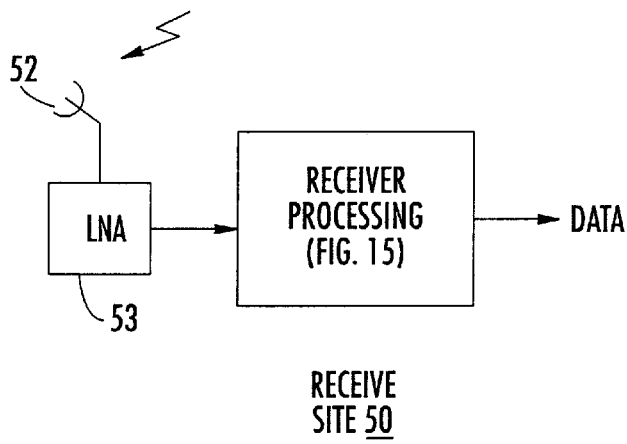
Figure 15:
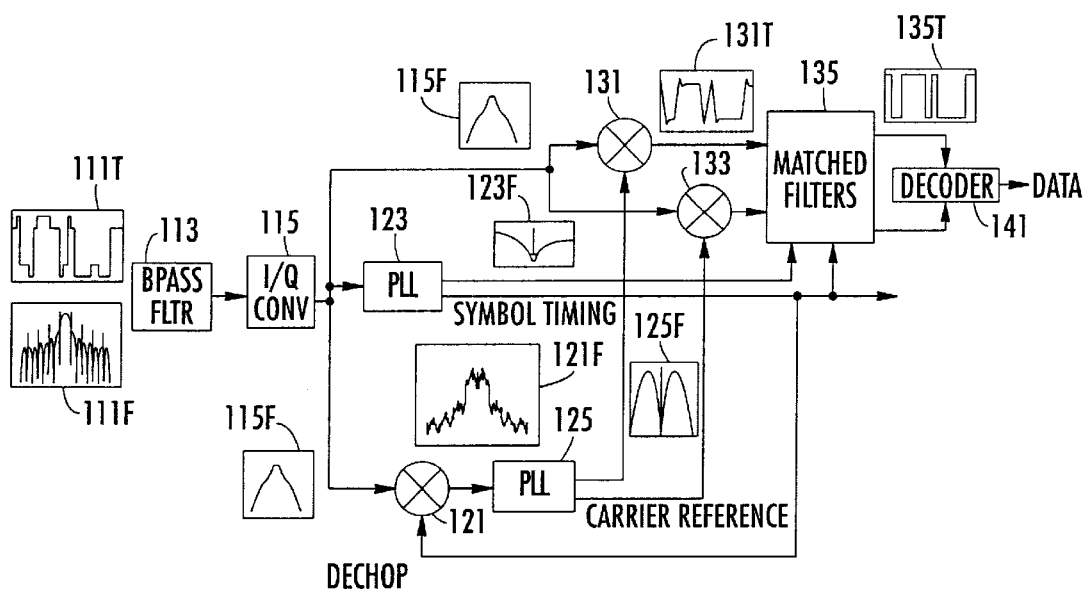

In accordance with a second embodiment of the invention, diagrammatically illustrated in FIGS. 14 and 15, a 'spread' carrier, that is functionally equivalent to that achieved by the direct insertion of a DC offset or bias voltage as in the embodiment of FIG. 6, is injected into the QPSK waveform, by replacing the fixed DC offset voltage feed to the summing unit 43 with a chopped or spread DC offset 101, that is produced by controllably gating a +0.k volt offset to the summing unit by means of a 'randomizing' or 'spreading' square wave pattern, such as one supplied by a pseudo-random noise (PN) generator 103.

To facilitate PN timing recovery in the demodulator, the PN sequence may be relatively short. Manchester or bi-phase coding of the PN sequence—i.e., multiplying the sequence values by an alternate +1/−1 volt signal—guarantees a transition at each mid-symbol. This, in turn, ensures that the carrier and data signals are time-orthogonal. As a consequence, the carrier does not interfere with the data signal (except for the small power loss described above), and the data bits do not produce phase jitter in the carrier recovery loop.

Since the loss incurred with QPSK is caused by a difference in level between a '1' and a '0', the difference can be made to average to zero over a symbol time by chopping the transmitted carrier with a square wave having values +1 and −1. If the carrier is chopped at the symbol rate, with an edge occurring at mid-bit, for example, the signal level will be averaged within the demodulator matched filter and no degradation will result. This restores the QPSK loss to be the same as for BPSK. It should be noted that the QPSK mechanism of the invention differs significantly from forming a no-carrier BPSK signal and then summing in the carrier in quadrature, as discussed in an article by J. Bussgang et al, entitled: "Phase Shift Keying with a Transmitted Reference," IEEE Transactions on Communication Technology, Vol. COM-14, NO. 1, February 1966, pp 14–22. This latter approach results in a carrier-containing signal with identical ONE and ZERO values and hence no bias loss. This method cannot be carried out with QPSK, since both quadrature channels are used to send data.

As shown in the demodulator diagram of FIG. 15, recovering the chopped or spread carrier requires a slightly more complex demodulator, since the carrier must be de-chopped or de-spread in order to be recovered. However, since the spreading operation is synchronous with symbol timing, the same circuitry may be used for both. In fact, just as transmitting a carrier results in simpler carrier recovery hardware, spreading the carrier can result in simpler symbol timing recovery hardware. Time (T) and frequency (F) domain waveforms are shown at various points in the demodulator diagram of FIG. 15.

Figure 17:
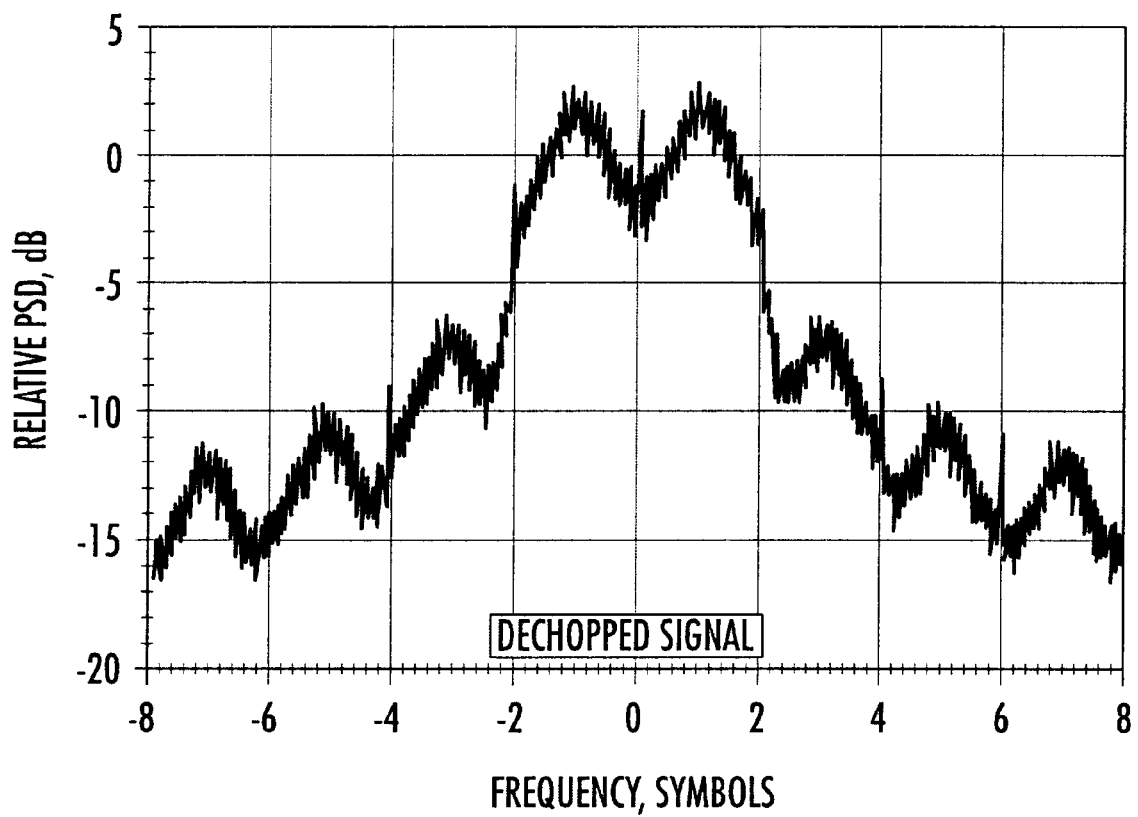
FIG. 17 shows the frequency spectrum of a despread signal produced by the demodulator of FIG. 15.

The received signal shown at 111T and 111F is filtered in a bandpass filter 113, and then down-converted to a complex baseband signal in an I/Q downconverter 115 (which may comprise quadrature mixer, and A/D converter). The complex baseband signal shown at 115F is coupled to a despreading mixer 121, to which a despreading PN waveform is supplied by a phase locked loop 123, tuned to the symbol rate, so as to produce the carrier signal spectrum 121F shown also in the spectral diagram of FIG. 17 to be described below. This carrier is filtered using a phase lock loop 125, which provides a coherent carrier reference 125F to each of in-phase channel and quadrature-phase channel mixers 131 and 133, to which the complex baseband signal 115F is applied.

The outputs of the mixers 131 and 133, one of which is shown at 131T, are then filtered in a pair of matched filters 135 for optimum detection, as in a conventional demodulator. As a non-limiting example, the matched filter outputs may be quantized to three or more bits, to provide good decoder performance. Optimum performance of the decoder requires accurate quantized decision levels. The use of a coherent automatic gain control (AGC) circuit 23 i.e., AGC-derived from the reference carrier—provides very accurate AGC and hence quantization levels by virtue of the relatively high signal-to-noise ratio realized by eliminating the non-linear carrier recovery circuit.

Symbol timing for the matched filters 135 shown at 123F is derived by filtering the data component of the chopped spectrum using phase lock loop 123. The recovered data samples shown at 135T and the symbol clock 123F are coupled to a downstream decoder 141.

Figure 16:
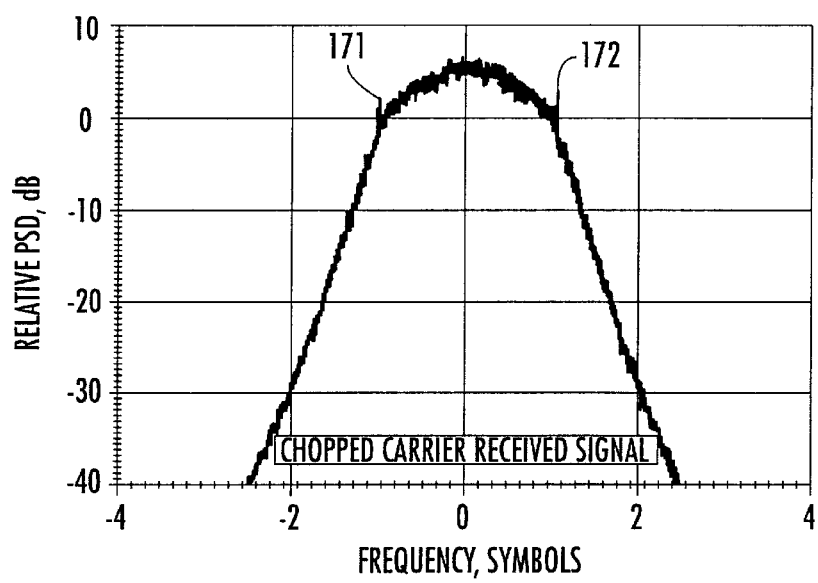
FIG. 16 shows the spectrum of a square-wave-chopped-carrier QPSK signal produced by the modulator of FIG. 14.

FIG. 16 shows the spectrum of a chopped-carrier QPSK signal, which has a small pair of "horns" 171 and 172 at the symbol rate. The unchopped signal results in a single carrier component exactly at the middle of the spectrum. FIG. 18 shows the frequency spectrum of the resultant despread signal, which goes only to the carrier recovery subsystem and not to the data recovery subsystem, and reveals two significant results. First, as described above, the carrier is recovered, and is located at the center of the signal spectrum. Second, the "modulation noise" due to the pseudo random modulation, which would normally get into the carrier recovery loop and cause jitter, is spread outwardly, so that most of the noise is outside the carrier recovery loop bandwidth.

Further reduction of the spectral lines in the transmitted signal may be accomplished by spreading the carrier spectrum with a more complex sequence, such as a pseudo-random noise (PN) sequence. The carrier is restored by multiplying the received signal by the identical PN sequence at the demodulator. Since the sequences must be identically aligned, a search procedure is implemented to obtain the correct PN sequence phase, as is done for code division multiple access (CDMA) signals in other systems.

As will be appreciated from the foregoing description, power utilization shortcomings of regeneration-based carrierless PSK modulation schemes, such as those employed for satellite communication systems, are effectively obviated by means of a QPSK modulation waveform that usurps a relatively limited portion of the available transmitter power, and injects in its place a prescribed amount of carrier energy, to facilitate recovery of the carrier at the receiver. Moreover, the injected carrier-based modulation scheme of the invention may employ high performance forward error correction coding schemes, to significantly reduce the signal power required for achieving a relatively low bit error rate.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of transmitting information comprising the steps of:

providing a data signal representative of the information and comprising in-phase (I) and quadrature (Q) components;

biasing at least one of the I and Q components with an offset comprising a direct current (DC) offset;

generating a quadrature phase shift keyed (QPSK) waveform based upon a carrier signal: and the at least one biased component; and transmitting the QPSK waveform.

2. A method according to claim 1, further including the steps of:

receiving the transmitted QPSK waveform; and processing the received QPSK waveform to extract said carrier signal therefrom.

3. A method according to claim 2, further including the step of:

processing the received QPSK waveform using the carrier signal extracted therefrom to derive said data signal.

4. A method according to claim 3, wherein said data signal is encoded with a forward error correction code, and further including the step of decoding the encoded data signal to recover said information from said data signal.

5. A method according to claim 4, wherein said forward error correction code is one capable of extending error rate performance to a value of energy per bit to noise density ratio ($E_b/N_0$) less than 4 dB.

6. A method according to claim 1, wherein generating the QPSK waveform comprises multiplying the carrier signal with the digital signal.

7. A communication system comprising:

a quadrature phase shift keyed (QPSK) waveform generator for generating a QPSK waveform based upon a carrier signal and a data signal, the data signal being representative of information to be transmitted and comprising I and Q components, and said QPSK waveform generator biasing at least one of the I and Q components with an offset prior to generating the QPSK waveform, the offset comprising a direct current (DC) offset voltage; and a transmitter for transmitting the QPSK waveform produced by said QPSK waveform generator.

8. A communication system according to claim 7, further including a receiver which is operative to receive said QPSK waveform and to extract said carrier signal therefrom.

9. A communication system according to claim 8, wherein said receiver is operative to process said QPSK waveform using said extracted carrier signal to derive said data signal.

10. A communication system according to claim 9, further including an encoder which is operative to encode said data signal with a forward error correction code, and wherein said receiver is operative to decode the encoded data signal to recover said information from said data signal.

11. A communication system according to claim 10, wherein said forward error correction code is one capable of extending error rate performance to a value of $E_b/N_0$ less than 4 dB.

12. A method comprising the steps of:

(a) providing a carrier signal comprising in-phase (I) and quadrature (Q) components;

(b) providing a data signal comprising I and Q components and biasing the I and Q components of the data signal with at least one offset comprising a spreading waveform; and (c) combining the I and Q components of the carrier signal with the biased I and Q components of the data signal, respectively, to produce a quadrature phase shift keyed (QPSK) waveform.

13. A method according to claim 12, further including the steps of:

(d) transmitting the QPSK waveform produced in step (c);

(e) receiving the QPSK waveform transmitted in step (d);

(f) conducting non-regenerative recovery of the QPSK waveform received in step (e) to extract said carrier signal therefrom; and (g) processing the QPSK waveform received in step (e) using the carrier signal extracted therefrom in step (f) to recover said data signal.

14. A method according to claim 13, wherein said data signal contains information encoded with a forward error correction code, and further including the step (g) of decoding the encoded data signal to recover said information.

15. A method according to claim 14, wherein said forward error correction code is a code capable of extending error rate performance to a value of energy per bit to noise density ratio ($E_b/N_0$) less than 4 dB.

16. A method according to claim 12, wherein combining comprises multiplying the I and Q components of the carrier signal with the biased I and Q components of the data signal, respectively.

17. A method comprising the steps of:

(a) receiving a quadrature phase shift keyed (QPSK) waveform having in-phase (I) and quadrature (Q) components of a carrier modulated with I and Q components of a data signal, at least one of the I and Q components of the data signal being biased by an offset comprising a direct current (DC) offset voltage; and (b) conducting non-regenerative recovery of the QPSK waveform received in step (a) to extract said carrier signal based upon the offset.

18. A method according to claim 17, further including the step (c) of processing the QPSK waveform received in step (a) using the carrier signal extracted therefrom in step (b) to recover said data signal.

19. A method according to claim 18, wherein said data signal contains information encoded with a forward error correction code capable of extending error rate performance to a value of energy per bit to noise density ratio ($E_b/N_0$) less than 4 dB, and further including the step (d) of decoding the encoded data signal to recover said information.

20. A method according to claim 17, wherein the at least one offset comprises a respective offset for each of the I and Q components of the data signal.

21. A method of transmitting information comprising the steps of:

providing a data signal representative of the information and comprising in-phase (I) and quadrature (Q) components;

biasing at least one of the I and Q components with an offset comprising a spreading waveform;

generating a quadrature phase shift keyed (QPSK) waveform based upon a carrier signal and the at least one biased component; and transmitting the QPSK waveform.

22. A method according to claim 21, further including the steps of:

receiving the transmitted QPSK waveform; and processing the received QPSK waveform to extract said carrier signal therefrom.

23. A method according to claim 22, further including the step of: processing the received QPSK waveform using the carrier signal extracted therefrom to derive said data signal.

24. A method according to claim 23, wherein said data signal is encoded with a forward error correction code, and further including the step of decoding the encoded data signal to recover said information from said data signal.

25. A method according to claim 24, wherein said forward error correction code is one capable of extending error rate performance to a value of energy per bit to noise density ratio ($E_b/N_o$) less than 4 dB.

26. A method according to claim 25, wherein generating the QPSK waveform comprises multiplying the carrier signal with the digital signal.

27. A communication system comprising:

a quadrature phase shift keyed (QPSK) waveform generator for generating a QPSK waveform based upon a carrier signal and a data signal, the data signal being representative of information to be transmitted and comprising I and Q components, and said QPSK waveform generator biasing at least one of the I and Q components with an offset prior to generating the QPSK waveform, the offset comprising a spreading waveform; and a transmitter for transmitting the QPSK waveform produced by said QPSK waveform generator.

28. A communication system according to claim 27, further including a receiver which is operative to receive said QPSK waveform and to extract said carrier signal therefrom.

29. A communication system according to claim 28, wherein said receiver is operative to process said QPSK waveform using said extracted carrier signal to derive said data signal.

30. A communication system according to claim 29, further including an encoder which is operative to encode said data signal with a forward error correction code, and wherein said receiver is operative to decode the encoded data signal to recover said information from said data signal.

31. A communication system according to claim 30, wherein said forward error correction code is one capable of extending error rate performance to a value of $E_b/N_o$ less than 4 dB.

* * * * *

UNITED STATES PATENT AND TRADEMARK OFFICE
CERTIFICATE OF CORRECTION

PATENT NO.    : 6,606,357 B1
DATED         : August 12, 2003
INVENTOR(S)   : Cobb et al.

It is certified that error appears in the above-identified patent and that said Letters Patent is hereby corrected as shown below:

Column 1,
Line 52, delete "-only" insert -- only --

Column 10,
Line 6, delete "23"

Column 11,
Line 2, delete "signal:" insert -- signal --

Signed and Sealed this

Twenty-fifth Day of November, 2003

JAMES E. ROGAN
*Director of the United States Patent and Trademark Office*